United States Patent [19]

Thorwesten

[11] Patent Number: 5,685,448
[45] Date of Patent: Nov. 11, 1997

[54] EXPLOSION PROTECTION LID IN LIGHTWEIGHT CONSTRUCTION, ESPECIALLY FOR PIPELINES

[76] Inventor: Albert Thorwesten, Dünninghausen 43, D-59269 Beckum, Germany

[21] Appl. No.: 448,626
[22] PCT Filed: Sep. 3, 1994
[86] PCT No.: PCT/EP94/02941
§ 371 Date: Aug. 9, 1995
§ 102(e) Date: Aug. 9, 1995
[87] PCT Pub. No.: WO95/10465
PCT Pub. Date: Apr. 20, 1995

[30] Foreign Application Priority Data

Oct. 8, 1993 [DE] Germany .................. 43 34 280.9

[51] Int. Cl.⁶ ............................................. B65D 51/16
[52] U.S. Cl. .................. 220/203.09; 220/203.01; 220/264; 220/326; 220/335; 220/89.1
[58] Field of Search ................... 220/202, 203.01, 220/203.05, 261, 263, 264, 326, 335, 366.1, 89.1, 203.09

[56] References Cited

U.S. PATENT DOCUMENTS

| 876,000 | 1/1908 | Hyatt ....................... 220/326 |
| 934,792 | 9/1909 | Card ......................... 220/326 |
| 1,312,892 | 8/1919 | Cashen ....................... 220/326 |
| 1,629,747 | 5/1927 | Stathes et al. ............. 220/326 X |
| 1,930,841 | 10/1933 | Miniere ....................... 220/335 |
| 2,105,735 | 1/1938 | Hodge . |
| 2,729,416 | 1/1956 | Waas ......................... 220/335 X |
| 3,334,770 | 8/1967 | Stanback ....................... 220/326 |
| 3,788,514 | 1/1974 | Giacoma, Jr. et al. ............. 220/89.1 |

FOREIGN PATENT DOCUMENTS

| 0350629 | 1/1990 | European Pat. Off. ............. 220/89.1 |
| 2292174 | 6/1976 | France . |
| 2645515 | 10/1990 | France . |
| 2455325 | 8/1976 | Germany . |
| 3042026 | 6/1982 | Germany . |
| 3106138 | 9/1982 | Germany . |
| 3626946 | 2/1988 | Germany . |
| 3734838 | 5/1988 | Germany . |

OTHER PUBLICATIONS

Silo–Thorwesten, Air–cushioned explosion doors, brochure published Jul. 1994.
Photograph of a "Light–construction explosion hinged lid", in closed position of the drain–pipe socket, nozzle, stub connection date unknown.

Primary Examiner—Stephen Cronin
Attorney, Agent, or Firm—Anderson Kill & Olick, P.C.

[57] ABSTRACT

An apparatus for compensating explosion induced pressure surges in a closed system and including an outlet stub attachable to the pressure relief element of the system and a hollow lid pivotally attached to the outlet stub, with the lid having an external planar wall and an internal arched wall attached to the external wall and having its concave surface facing the external wall with which the internal wall defines the hollow of the lid.

10 Claims, 2 Drawing Sheets

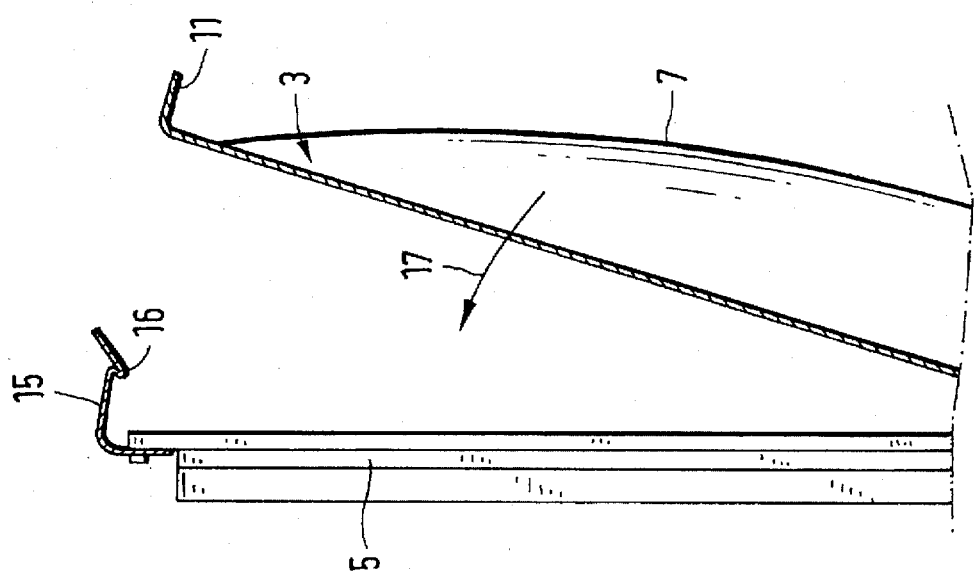
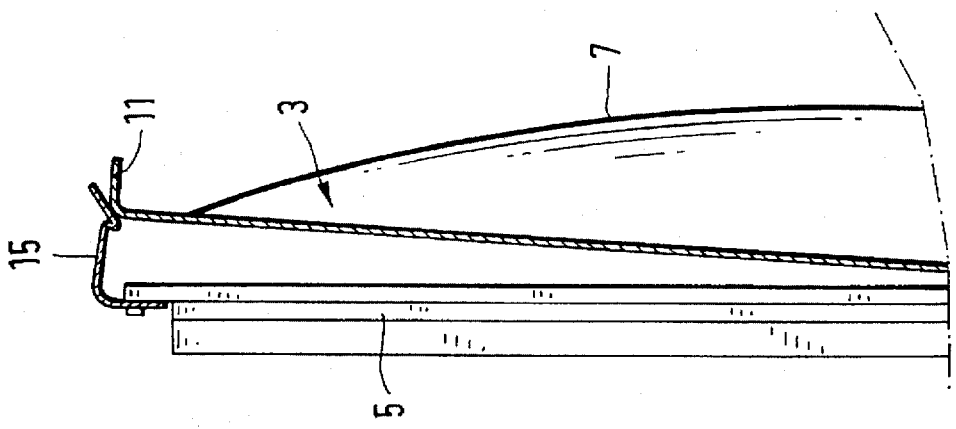
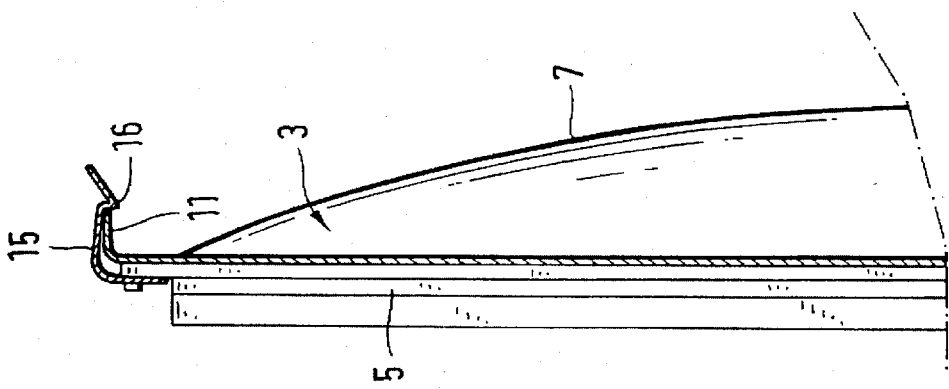

EXPLOSION PROTECTION LID IN LIGHTWEIGHT CONSTRUCTION, ESPECIALLY FOR PIPELINES

BACKGROUND OF THE INVENTION

1. Field of the Invention

The invention is directed towards an apparatus for compensation or equalization of pressure surges in the course of possible dust, dirt or gas explosions in closed systems, such as silos, pipelines or the like with a hinged cover or lid in lightweight construction pivotable around a pivot axis at an outlet stub.

2. Summary of the Invention

In order to divert pressure surges in containers through pipelines prior to their striking for instance downstream elements such as filters or the like, so-called explosion protection covers or lids are known, as for instance from the DE-A-24 55 325, the DE-A-30 42 026 or the DE-A 31 06 138. This lastly mentioned explosion protection lid in lightweight construction has given a good account of its self in actual practice, especially the system for damping of the lid when it opens as intended. A refinement of the damping system is shown in the DE-A-36 26 946.

It was seen that in particular in pipelines due to the extremely high propagation velocity of pressure surges or waves, which can normally only propagate in one direction in pipelines, the lastly mentioned arrangement can still be improved, in particular as far as the design of the hinged lid itself is concerned.

It is a task of the invention to design such a hinged cover or lid in an even more lightweight manner, so that it can be moved by the pressure surge in particular at an even higher velocity without being destroyed in the open position.

SUMMARY OF THE INVENTION

This task is solved by the invention in an arrangement of the previously described type in that the hinged lid is configured at least partially as a hollow member.

The design as partial hollow member entails a large number of advantages. Thus thinner sheet metal plates can overall be used for the construction of the lid, the cavity can be used for additional purposes as this is described further below and more of the like.

It is provided in the design that the hinged lid or cover has a planar outer surface, wherein the surface of the hinged lid pointing towards the inside of the stub and located opposite the inner-and outer-surface is configured in an arched or domed manner.

This design provides additional considerable advantages, as tests have shown, namely that the impacting pressure surge does not hit a planar surface, rather an arched or domed one, which on the one hand results in an improved initiation of the opening forces and on the other hand to a better diversion of the gases striking in an explosion-like manner.

Thus the cavity of the hinged lid or cover can be foamed out with insulation foam material, the lid can additionally be equipped with a hinge bracket and/or with a heating device or more of the like.

It can also be provided in the invention, to thermally separate the internal and external surface of the hinged cover, for instance to rivet or bond said surfaces against one another with interposition of a plastics insulation ring. This is expedient especially if formation of condensation water is to be avoided. It is also advantageous to equip the apparatus in the invention with damping elements for the opening hinged cover, such as spring element, which supports the flexural disk or plate of the lid.

According to the invention it is also provided that the recovery dish be equipped with a clamping spring lock for fixation of the swiveled out lid or cover in the open state, in order to prevent the lid from swiveling back in an uncontrolled manner. It is also achieved in case of an explosion, by the fixation or fastening in the open position that this disturbance can be optically determined from the outside due to the open and kept open lid.

BRIEF DESCRIPTION OF THE DRAWINGS

In the following the invention is described with particularity with the help of examples shown on the drawing, which show on:

FIG. 2. plan view along arrow II in FIG. 1 as well on

FIGS. 3a. to 3c. a portion of the valve in the invention with a part of the recovery dish, wherein the lid is presented in three different positions relatively to the recovery dish.

DETAILED DESCRIPTION OF THE PREFERRED EMBODIMENT

Figure 1:
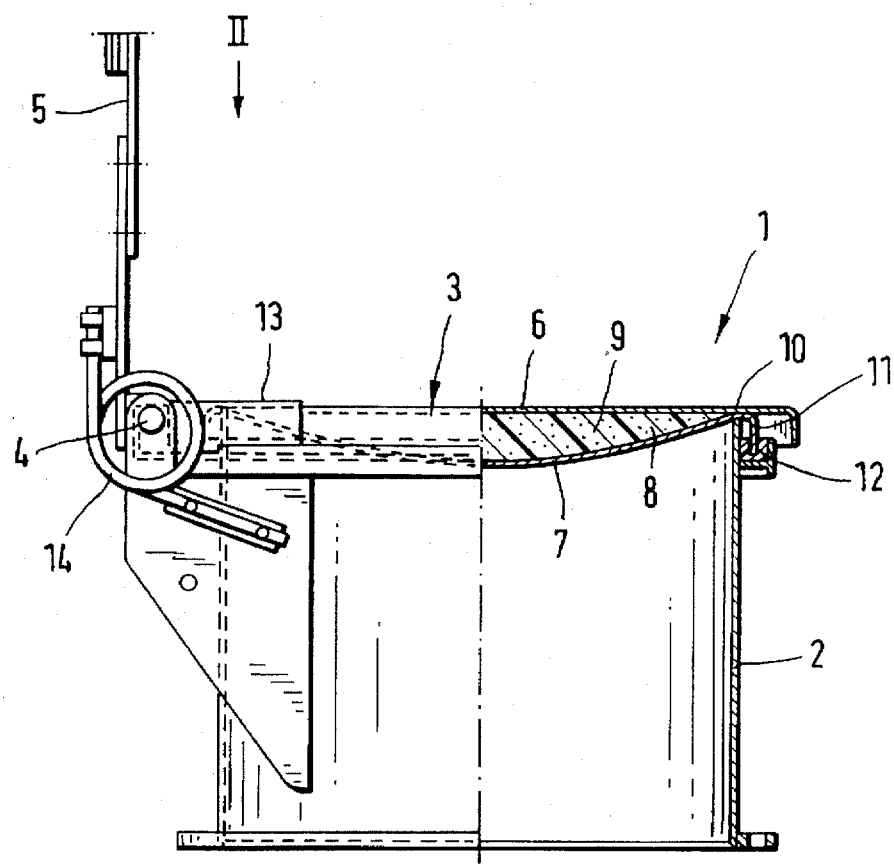
FIG. 1. a side view of the arrangement partially in section.

The arrangement generally designated with the numeral 1 in the figures comprises an outlet stub 2, which can for instance be flanged to a load relief portion of the pipe line. This outlet stub 2 is provided with a hinged lid generally designated by the numeral 3, which in case of an application of pressure, for instance by a blast or deflagration in the pipeline can be pivoted around a pivot axis 4 against a flexural recovery or capturing dish 5 of which only a portion is shown in FIG. 1.

The hinged lid 3 is configured as a hollow member, meaning it has a planar external surface 6, for instance from aluminum sheet of 2 mm. thickness, and an internal surface 7 curved or arched in spherical segment like manner; herein the cavity designated by the numeral 8 between the internal surface 7 and the external surface 8 is filled with a plastics foam 9.

Figure 2:
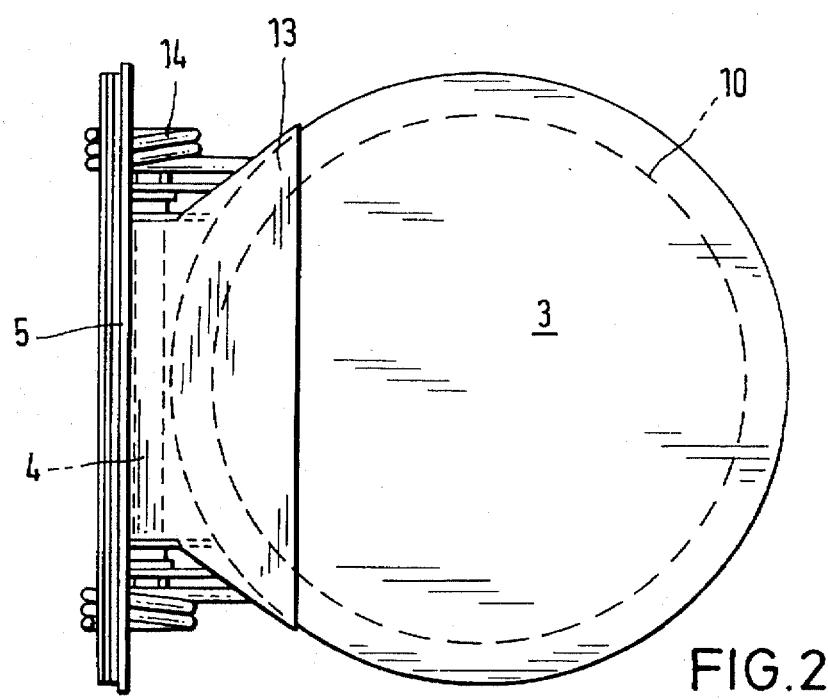

The external surface 6 and internal surface 7 can also be connected with one another by point welding along the contact line 10 which is outlined in a dotted manner in FIG. 2; in this case however, an interposed insulation ring for thermal separation can be provided in such a way, that the external surface 6 and the internal surface 7 and said insulation ring are bonded or riveted with one another, which has not been shown in detail here. The metal sheet forming the internal surface 7 comprises a sealing web 11 embracing the outlet stub 2 externally, which sealing web 11 engages from the top into an annular seal 12 which externally surrounds the outlet stub 2.

The lid 3 is provided in the area of the pivot axis 4 with a hinge bracket partially overlapping same externally, which hinge bracket 13 can also be configured at least regionally as a pocket, into which the hinged lid 3 engages.

It is shown additionally in FIGS. 1 and 2 that the recovery or capturing dish 5 is flexurally supported by means of helical springs 14; the possibility of equipping the hinged lid 3 with an additional heating device is not shown in detail.

The hinged lid 3 is shown in different positions relatively to the flexural capture dish 5 in FIGS. 3a. to 3c. Herein it can be seen from these figures, that the flexural capture or recovery dish 5 is equipped, in the upper region of the example shown, with a clamping spring lug 15, which lug cooperates with the margin or edge 11 of the lid 3 in such a way, that the edge 11 can pivot to below the lug 15, can however be fixed in the open position by means of a nose-like attachment 16.

The different pivot positions are shown in FIG. 3a. to 3c., wherein in FIG. 3a. the lid 3 is still comparatively far from the capturing dish 5, with the pivoting motion in the opening direction being indicated by the arrow 17. In FIG. 3b. the lid 3 is shown just before contact with the clamping spring lug 15, while in FIG. 3c. the detent or snap-in position is shown, meaning the lid 3 is fixed in the open position in the capture or recovery dish 5 by the clamping spring lug 15 or the clamping extension 16.

Naturally the embodiment example described in the invention can still be changed in many respects, without abandoning the thought in the invention. Thus the invention is not necessarily limited to the curvature or arching of the internal surface 7 as a spherical segment, in this respect a cross sectional elliptical shape or a shape curved in another way can be provided and more of the same.

I claim:

1. An apparatus for compensating explosion-induced pressure surges in a closed system having pressure relief means, said apparatus comprising:

an outlet stub attachable to the pressure relief means; and a hollow lid pivotally attached to said outlet stub, wherein the lid has an external planar wall and an internal arched wall attached to the external planar wall and having a concave surface thereof facing the external planar wall, the external planar wall and the internal arched wall defining together a hollow of the lid.

2. An apparatus according to claim 1 wherein the external planar wall and the internal arched wall are formed of thin light-metal sheets.

3. An apparatus according to claim 1, wherein the lid hollow is filled with a foam insulation.

4. An apparatus according to claim 1, wherein the metal sheet, forming the internal arched wall, is formed as a spherical segment having an edge thereof attached to the external planar wall by point welding, and wherein a circular sealing web is provided on an outer circumference of the edge.

5. An apparatus according to claim 1, wherein the lid is provided, in a region of a pivotal axis thereof, with a hinge bracket.

6. An apparatus according to claim 5, wherein the hinge bracket is approximately pocket-shaped.

7. An apparatus according to claim 1, further comprising a heating device located in the lid hollow.

8. An apparatus according to claim 1, wherein the external planar wall and the internal arched wall are thermally separated.

9. An apparatus according to claim 1, further comprising a recovery dish, and elastic elements for connecting the recovery dish to the outer stub, wherein faces of the lid and the recovery dish, which converge during the opening process, are planar.

10. An apparatus according to claim 9, wherein the recovery dish has a clamping spring lug for fixing the lid in a pivoted-out position.

* * * * *